US012258429B2

(12) United States Patent
Wang et al.

(10) Patent No.: US 12,258,429 B2
(45) Date of Patent: Mar. 25, 2025

(54) C2C3 RANDOM COPOLYMER COMPOSITION

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuss, Linz (AT); Stefan Ortner, Linz (AT)

(73) Assignee: BOREALIS AG, Vienna (AT)

( * ) Notice: Subject to any disclaimer, the term of this patent is extended or adjusted under 35 U.S.C. 154(b) by 572 days.

(21) Appl. No.: 17/610,502

(22) PCT Filed: May 20, 2020

(86) PCT No.: PCT/EP2020/064028
§ 371 (c)(1),
(2) Date: Nov. 11, 2021

(87) PCT Pub. No.: WO2020/239561
PCT Pub. Date: Dec. 3, 2020

(65) Prior Publication Data
US 2022/0251259 A1     Aug. 11, 2022

(30) Foreign Application Priority Data
May 29, 2019   (EP) .................... 19177301

(51) Int. Cl.
C08F 210/16    (2006.01)
B32B 27/08     (2006.01)
B32B 27/32     (2006.01)
C08F 2/00      (2006.01)
C08F 4/659     (2006.01)
C08F 4/6592    (2006.01)
C08F 210/02    (2006.01)
C08F 210/06    (2006.01)
C08F 210/08    (2006.01)
C08L 23/16     (2006.01)

(52) U.S. Cl.
CPC ............ *C08F 210/06* (2013.01); *B32B 27/08* (2013.01); *B32B 27/32* (2013.01); *C08F 2/001* (2013.01); *C08F 4/65912* (2013.01); *C08F 4/65916* (2013.01); *C08F 4/65927* (2013.01); *C08F 210/02* (2013.01); *C08F 210/08* (2013.01); *C08L 23/16* (2013.01); *B32B 2250/242* (2013.01); *B32B 2307/31* (2013.01); *B32B 2307/412* (2013.01); *B32B 2307/54* (2013.01); *B32B 2307/558* (2013.01); *B32B 2439/46* (2013.01); *B32B 2439/70* (2013.01); *B32B 2439/80* (2013.01); *C08L 2201/10* (2013.01); *C08L 2203/02* (2013.01); *C08L 2203/162* (2013.01); *C08L 2205/025* (2013.01); *C08L 2205/03* (2013.01); *C08L 2308/00* (2013.01); *C08L 2314/06* (2013.01)

(58) Field of Classification Search
CPC .... C08F 210/16; C08F 210/06; C08F 4/6592; C08L 23/16; C08L 23/14; C08L 2205/025; C08L 2203/162
See application file for complete search history.

(56) References Cited

U.S. PATENT DOCUMENTS

| | | | | |
|---|---|---|---|---|
| 5,780,168 A * | 7/1998 | Satoh | .................... | C08L 23/142 525/240 |
| 6,822,049 B2 * | 11/2004 | Ebara | ........................ | C08J 5/18 525/240 |
| 8,217,117 B2 * | 7/2012 | Hino | ....................... | C08L 23/10 525/240 |
| 8,329,824 B2 * | 12/2012 | Mori | ....................... | C08L 23/10 525/240 |
| 8,476,395 B2 | 7/2013 | Grein et al. | | |
| 8,802,779 B2 * | 8/2014 | Okamoto | ................ | C08L 23/10 525/240 |
| 9,120,294 B2 * | 9/2015 | Lee | ........................ | B32B 27/327 |
| 11,680,118 B2 * | 6/2023 | Wang | .................. | C08F 4/65927 525/240 |
| 2007/0116911 A1 | 5/2007 | Miller et al. | | |
| 2009/0297820 A1 | 12/2009 | Kovalchuk et al. | | |
| 2012/0094042 A1 * | 4/2012 | Lee | ........................ | B32B 27/08 525/322 |

(Continued)

FOREIGN PATENT DOCUMENTS

EP      0887379 B1    12/1998
EP      1820821 A1    8/2007

(Continued)

OTHER PUBLICATIONS

Applicant: Borealis AG; "C2C3 Random Copolymer Composition"; Chinese Application No. 202080035647.1; First Chinese Office Action dated Oct. 18, 2022; 27 pgs.
Busico, Vincenzo, et al., "ALK-1-ENE Polymerization in The Presence of a Monocyclopentadienyl Zirconium(IV) Acetamidinate Catalyst: Microstructural and Mechanistic Insights", Macromol. Rapid Commun. 2007, 28, 1128-1137.

(Continued)

*Primary Examiner* — Rip A Lee
(74) *Attorney, Agent, or Firm* — Tarolli, Sundheim, Covell & Tummino LLP

(57) ABSTRACT

New $C_2C_3$ random copolymer composition, which shows improved sealing behaviour due to low sealing initiation temperature (SIT) and high hot tack force. In addition, the inventive composition shows an excellent sterilization behaviour, i.e. retention of low haze level after sterilization. The present invention is furthermore related to the manufacture of said copolymer composition and to its use.

13 Claims, No Drawings

(56) References Cited

U.S. PATENT DOCUMENTS

| | | | | |
|---|---|---|---|---|
| 2012/0315463 A1* | 12/2012 | Miura | ............. | B32B 5/18 |
| | | | | 428/317.1 |
| 2018/0030255 A1 | 2/2018 | Tranninger et al. | | |
| 2020/0056028 A1* | 2/2020 | Van Houcke | ............. | B32B 27/24 |
| 2022/0017734 A1* | 1/2022 | Wang | ............. | C08J 5/18 |
| 2022/0227901 A1* | 7/2022 | Wang | ............. | C08J 5/18 |

FOREIGN PATENT DOCUMENTS

| | | | |
|---|---|---|---|
| EP | 2622013 A1 | | 8/2013 |
| EP | 2965908 B1 | | 1/2016 |
| EP | 3064514 B1 | | 9/2016 |
| JP | 2009035308 A | * | 2/2009 |
| JP | 2015171772 A | * | 10/2015 |
| WO | 92/12182 A1 | | 7/1992 |
| WO | 94/14856 A1 | | 7/1994 |
| WO | 1995/012622 A1 | | 5/1995 |
| WO | 1999/24478 A1 | | 5/1999 |
| WO | 1999/24479 A1 | | 5/1999 |
| WO | 00/68315 A1 | | 11/2000 |
| WO | 2002/02576 A1 | | 1/2002 |
| WO | 2004/000899 A1 | | 12/2003 |
| WO | 2004/111095 A1 | | 12/2004 |
| WO | 2005090467 A1 | | 9/2005 |
| WO | 2006/097497 A1 | | 9/2006 |
| WO | 2011/076780 A1 | | 6/2011 |
| WO | 2011/135004 A1 | | 11/2011 |
| WO | 2012/001052 A1 | | 1/2012 |
| WO | 2012/084961 A1 | | 6/2012 |
| WO | 2013/007650 A1 | | 1/2013 |
| WO | 2015/158790 A1 | | 10/2015 |
| WO | 2017/016711 A1 | | 2/2017 |
| WO | 2018/122134 A1 | | 7/2018 |
| WO | 2018/211107 A1 | | 11/2018 |
| WO | 2019/012110 A1 | | 1/2019 |
| WO | WO-2020002349 A1 * | 1/2020 | ............. B32B 27/32 |
| WO | WO-2020239562 A1 * | 12/2020 | ......... B29C 48/0018 |

OTHER PUBLICATIONS

Cheng, et al., "13C NMR Analysis of Ethylene-Propylene Rubbers", Macromolecules 17, 1984, 1950-1955.

Resconi, Luigi, et al., "Selectivity in Propane Polymerization With Metallocene Catalysts", Chem. Rev. 2000, 100, 1253-1345.

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

Wang, et al., "Structural Analysis of Ethylene/Propylene Copolymers Synthesized with a Constrained Geometry Catalyst", Macromolecules 2000, 33, 1157-1162.

Bartczak, Z., et al., "Blends of propylene-ran-ethylene and propylene-ran-(1-butene) copolymers" Crystal superstructure and mechanical properties European Polymer Journal 42 (2006) 1819-1829.

Kakugo, Masahiro, et al., "13C NMR Determination of Monomer Sequence Distribution in Ethylene-Propylene Copolymers Prepared with delta-TiC13—Al(C2H5)2 Cl" Macromolecules 1982, 15, 1150-1152.

Tafmer (TM) BL2491M, retrieved Nov. 6, 2019, retrieved from the Internet: URL:hhhttp://168plas.com/PhysicalProducts/Detail/A7F2E74C-2351-451C-9DDA-F4F61B3893B6.html.

Applicant: Borealis AG; Indian Application No. 202117051551; Indian Examination Report; dated Mar. 29, 2022; 6 pgs.

* cited by examiner

C2C3 RANDOM COPOLYMER COMPOSITION

The present invention is related to a new $C_2C_3$ random copolymer composition, which shows improved sealing behaviour due to low sealing initiation temperature (SIT) and high hot tack force (HTF). In addition, the inventive composition shows an excellent sterilization behaviour, i.e. retention of low haze level after sterilization. The present invention is furthermore related to the manufacture of said copolymer composition and to its use.

Polypropylenes are Suitable for Many Applications.

For instance, polypropylene (PP) is applicable in areas where sealing properties play an important role, like in the food or medical packing industry, especially when a good combination of transparency and mechanical performance is desired. Such a combination is difficult to achieve if the material should be suitable for sealing layers of multi-layer films, which require a good balance between sealing initiation temperature (SIT) and hot tack force (HTF). A combination of lower SIT and higher HTF allows the converter to run the lines during the packaging step at higher speeds, but the overall performance of the film construction will only be satisfactory if the sealing layer is sufficiently flexible, tough and transparent.

To ensure fast sealing, a low SIT is of advantage. By operating at lower temperature there is the benefit that the article to be sealed is not exposed to high temperatures. There are also economical advantages, since lower temperatures are of course cheaper to generate and maintain.

There are further advantages in avoiding high sealing temperatures, especially when temperature sensitive goods are to be packed.

Furthermore, it is also desired to have a packaging material with satisfactory optical properties, such as low haze and/or high clarity.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilization is usually carried out in a temperature range of about 120° C. to 130° C. Thus, the material should have a sufficient thermal stability, like a melting temperature higher than the usual steam sterilization temperature of about 120° C. to 130° C.

Of course, treatment of a polymer under the sterilization conditions outlined above can impair its final properties, especially the optical properties such as transparency.

Irrespective of the polymer type, a polymer must fulfil at best all desired end properties and additionally must be easily processable, i.e. it must withstand stress. However, end properties and processing properties act often in a conflicting manner.

It frequently turns out that improvement of one of the desired properties is achieved at the expense of at least one of the other properties.

Several attempts have been made to solve the above problem.

EP 3064514 B1, for example, discloses a $C_2C_3$ random copolymer composition for heat sealing comprising three polymer fractions (A), (B) and (C) with different comonomer content, whereby the composition is obtained in the presence of a metallocene catalyst.

Claimed are $C_2C_3$ random copolymer compositions comprising polymer fractions (A), (B) and (C), whereby, fraction (A) has a C2 content (C2 A) of 0.4 to 1.5 wt %, fraction (B) has a C2 content (C2 B) of 3.0 to 10.0 wt %, and fraction (C) has a C2 content (C2 C) of 7.0 to 15.0 wt %, whereby the comonomer content of the polymer fractions increases from fraction (A) to fraction (C) according to (C2 A)<(C2 B)<(C2 C), and whereby the composition is characterized by (i) a total C2 content in the range of 3.0-7.0 wt %, (ii) a melt flow rate MFR2 (230° C.) in the range of 2.0 to 15.0 g/10 min, (iii) a melting temperature Tm of from 128° C. to 145° C., (iv) a crystallization temperature Tc of from 85° C. to 110° C. and (v) a hexane solubles content determined in accordance with FDA section 177.1520 of at most 2.0 wt %.

Such compositions have a low sealing initiation temperature (SIT) but also low hot tack force (HTF).

The key drawback of such compositions is the poor sterilization resistance, which results in a drastic increase in haze after sterilization.

EP 2965908 B1 discloses a PP random copolymer with ethylene, wherein (a) said propylene copolymer has a C2 content in the range of 5.3 to 9.0 wt %, a melting temperature Tm in the range of 128° C. to 138° C., and a xylene cold soluble fraction (XCS) in the range of 9.0 to 18.0 wt %. Said propylene copolymer comprises two fractions: a first propylene copolymer fraction (R-PP1) and a second propylene copolymer fraction (R-PP2) and said first propylene copolymer fraction (R-PP1) differs from said second propylene copolymer fraction (R-PP2) in the ethylene content.

Such compositions show already quite a good balance of SIT and HTF, but still poor sterilization resistance, which results in a drastic increase in haze after sterilization.

WO 2018/211107 A1 discloses a polyolefin composition comprising (A) a random copolymer of propylene with one or more monomers selected from ethylene and a $C_4$-$C_{12}$ alpha olefin having a comonomer content of 1.0 to 10 wt % based on the weight of the random copolymer of propylene and (B) a polymer of 1-butene having a weight average molecular weight Mw of 100,000 to 300,000 g/mol and a molecular weight distribution Mw/Mn of below 6.0. The presence of the polymer of 1-butene (B) in the composition shows a reduction of the SIT, which, however, still can be improved. WO 2018/211107 A1 additionally is silent on sterilization resistance.

Therefore, there is still a need to design materials having improved sealing behaviour due to low sealing initiation temperature (SIT) and high hot tack force (HTF), and in addition having an excellent sterilization behaviour, i.e. retention of low haze level after sterilization.

The present invention is based on the finding that the above discussed needs for heat sealing applications, i.e. simultaneously having low sealing initiation temperature (SIT), high hot tack force (HTF) and excellent sterilization behaviour, can be achieved by a specific design of a polyolefin composition.

Thus, according to a first aspect the present invention is directed to a $C_2C_3$ random copolymer composition comprising (A) 70.0 to 95.0 wt % of a $C_2C_3$ random copolymer having
  (a) an ethylene content in the range of from 2.5 to 5.5 wt %;
  (b) a melt flow rate MFR2 (230° C./2.16 kg) measured according to ISO 1133 in the range of from 4.0 to 12.0 g/10 min;
  (c) a melting temperature Tm as determined by DSC according to ISO 11357 of from 115° C. to 135° C. and
  (d) a xylene cold soluble (XCS) fraction of from 0.1 wt % to below 15.0 wt % and (B) 5.0 to 30.0 wt % of an propylene-1-butene plastomer having
  (e) an $MFR_2$ (230° C./2.16 kg) measured according to ISO 1133 in the range of 2.0 to 20.0 g/10 min,
  (f) a melting temperature Tm as determined by DSC according to ISO 11357 of from 60° C. to 110° C. and
  (g) a tensile modulus measured according to ASTM D638 in a range of from 50 to 450 MPa.

Preferably, the $C_2C_3$ random copolymer (A) comprises polymer fractions (A-1) and (A-2), and is obtainable, preferably obtained, in the presence of a metallocene catalyst.

In a further aspect the invention is related to sterilizable or sterilized articles, like sterilizable or sterilized films, preferably comprising the above defined $C_2C_3$ random copolymer composition, whereby the films are characterized by
  (i) a sealing initiation temperature (SIT) (determined as described in the experimental part) in the range of from 80° C. to below 110° C.,
  (ii) a hot-tack force determined (as described in the experimental part on 50 μm cast film) of above 2.5 to up to 6.0 N,
  (iii) a haze (determined according to ASTM D1003-00 on cast film with a thickness of 50 μm) of from 0.05 to below 3.0% and a haze (determined according to ASTM D 1003-00 measured on cast film with a thickness of 50 μm) after sterilization (steam sterilization at 121° C. for 30 min) of from 1.5 to below 7.0% and
  (iv) a clarity (determined according to ASTM D1003-00 on cast film with a thickness of 50 μm) of at least 85.0% up to 100.0% and a clarity (determined according to ASTM D1003-00 on cast film with a thickness of 50 μm) after sterilization (steam sterilization at 121° C. for 30 min) of at least 75.0% up to 98.0%.

In a further aspect, the present invention is related to the use of the films according to the invention for lamination or mono- or multilayer films for packaging films and medical/hygienic films.

As alternative in one further aspect the present invention is related to the use of the monolayer films according to the invention as sealing layer in a polypropylene multi-layer film, which can be manufactured either by co-extrusion or lamination.

In the Following, the Invention is Defined in More Detail.

$C_2C_3$ Random Copolymer (A)

The $C_2C_3$ random copolymer composition according to the present invention comprises at 70.0 to 95.0 wt % of $C_2C_3$ random copolymer (A). Preferably, the amount of $C_2C_3$ random copolymer (A) is in the range of 75.0 to 93.0 wt %, like in the range of 78.0 to 92.0 wt %.

The $C_2C_3$ random copolymer (A) used in the $C_2C_3$ random copolymer composition of the invention is a random copolymer of propylene and ethylene as comonomer.

The $C_2C_3$ random copolymer (A) is obtainable, preferably obtained, in the presence of a metallocene catalyst.

The $C_2C_3$ random copolymer (A) used in the $C_2C_3$ random copolymer composition according to this invention is featured by a moderate to low ethylene comonomer content.

Accordingly, the $C_2C_3$ random copolymer (A) has an ethylene content in the range of 2.5 to 5.5 wt %, preferably in the range of from 2.7 to 5.0 wt %, more preferably in the range of from 2.8 to 4.8 wt %.

The $C_2C_3$ random copolymer (A) has a melt flow rate $MFR_2$ (230° C.) measured according to ISO 1133 in the range of from 4.0 to 12.0 g/10 min, preferably in the range of from 5.0 to 10.0 g/10 min, and more preferably in the range of from 6.0 to 9.0 g/10 min.

Additionally, the $C_2C_3$ random copolymer (A) can be defined by the xylene soluble (XCS) content measured according to ISO 16152; 2005. Accordingly, the $C_2C_3$ random copolymer (A) is preferably featured by a xylene cold soluble (XCS) content of from 0.1 wt % to below 15.0 wt %, like in the range of from 2.0 to below 15.0 wt %.

Preferably, the $C_2C_3$ random copolymer (A) has a xylene cold soluble (XCS) content in the range of from 3.0 to 14.0 wt % and more preferably in the range of 5.0 to 13.0 wt %.

The $C_2C_3$ random copolymer (A) can be further defined by the melting temperature (Tm) measured via DSC according to ISO 11357. Accordingly, the $C_2C_3$ random copolymer (A) has a melting temperature Tm in the range of from 115° C. to 135° C., preferably in the range of from 118° C. to 132° C., and more preferably in the range of from 120° C. to 130° C.

In order to facilitate processing, especially film processing, it is also desirable that the $C_2C_3$ random copolymer (A) according to the present invention has a suitable crystallization temperature even in absence of any nucleating agents. Preferably, the $C_2C_3$ random copolymer (A) has a crystallization temperature Tc as determined by DSC (differential scanning calorimetry) according to ISO 11357 in the range of 75° C. to 110° C., more preferably in the range of 80° C. to 105° C., like in the range of 82° C. to 100° C.

The $O_2O_3$ random copolymer (A) preferably has in addition a flexural modulus as determined according to ISO 178 on injection moulded specimens in the range of from 350 to below 1000 MPa, preferably in the range of 400 to 800 MPa, more preferably in the range of 500 to 750 MPa.

Thus, in a further preferred embodiment of the present invention the $C_2C_3$ random copolymer (A) has
  (a) an ethylene content in the range of from 2.5 to 5.5 wt %;
  (b) a melt flow rate MFR2 (230° C./2.16 kg) measured according to ISO 1133 in the range of from 4.0 to 12.0 g/10 min;
  (c) a melting temperature Tm as determined by DSC according to ISO 11357 of from 115° C. to 135° C.;
  (d) a xylene cold soluble (XCS) fraction of from 0.1 wt % to below 15.0 wt %, (e) a crystallization temperature Tc as determined by DSC (differential scanning calorimetry) according to ISO 11357 in the range of 75° C. to 110° C. and (f) a flexural modulus as determined according to ISO 178 on injection moulded specimens of 350 to below 1000 MPa, preferably in the range of 400 to 800 MPa.

The $C_2C_3$ random copolymer (A) is preferably multimodal, like bimodal in view of the comonomer content and comprises, preferably consists of polymer fractions (A-1) and (A-2).

Thus, the $C_2C_3$ random copolymer (A) comprises 30.0 to 70.0 wt % of polymer fraction (A-1) having
(i) an ethylene content in the range of from 1.5 to 4.5 wt % and
(ii) a melt flow rate MFR2 (230° C./2.16 kg) measured according to ISO 1133 in the range of from 4.0 to 15.0 g/10 min and 70.0 to 30.0 wt % of polymer fraction (A-2) having
(i) an ethylene content in the range of from 4.6 to 7.5 wt % and
(ii) a melt flow rate MFR2 (230° C./2.16 kg) measured according to ISO 1133 in the range of from 4.0 to 15.0 g/10 min.

Preferably, the $C_2C_3$ random copolymer (A) comprises 35.0 to 70.0 wt % of polymer fraction (A-1) and 30.0 to 65.0 wt % of polymer fraction (A-2).

More preferably, the $C_2C_3$ random copolymer (A) comprises 40.0 to 65.0 wt % of polymer fraction (A-1) and 35.0 to 60.0 wt % of polymer fraction (A-2).

Polymer fraction (A-1) preferably has an ethylene content in the range of from 1.8 to 4.2 wt % and more preferably in the range of from 2.0 to 4.0 wt %.

The melt flow rate $MFR_2$ (230° C./2.16 kg) measured according to ISO 1133 of polymer fraction (A-1) is preferably in the range of from 5.0 to 12.0 g/10 min and more preferably in the range of from 6.0 to 11.0 g/10 min.

Polymer fraction (A-2) preferably has an ethylene content in the range of from 4.7 to 7.0 wt % and more preferably in the range of from 4.8 to 6.5 wt %.

The melt flow rate $MFR_2$ (230° C./2.16 kg) measured according to ISO 1133 of polymer fraction (A-2) is preferably in the range of from 5.0 to 12.0 g/10 min and more preferably in the range of from 6.0 to 10.0 g/10 min.

The $C_2C_3$ random copolymer (A) is therefore preferably prepared by polymerizing propylene and ethylene by a sequential polymerization process comprising at least two reactors connected in series in the presence of a metallocene catalyst.

Thus, the $C_2C_3$ random copolymer (A) is prepared in a sequential polymerization process comprising at least two polymerization reactors (R1) and (R2), whereby in the first polymerization reactor (R1) a first polymer fraction (A-1) is produced, which is subsequently transferred into the second polymerization reactor (R2). In the second polymerization reactor (R2), a second polymer fraction (A-2) is then produced in the presence of the first polymer fraction (A-1).

Polymerization processes which are suitable for producing the $C_2C_3$ random copolymer (A) generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the $C_2C_3$ random copolymer (A) is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by *Borealis* (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the $C_2C_3$ random copolymer composition as defined above the conditions for the first reactor (R1), i.e. the slurry reactor (SR), like a loop reactor (LR), of step (a) may be as follows:
the temperature is within the range of 40° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

Preferably, the $C_2C_3$ random copolymer (A) according to this invention is produced in the presence of a metallocene catalyst.

Thus, the $C_2C_3$ random copolymer (A) is produced by a process comprising the following steps:
a) polymerizing in a first reactor (R1) propylene and ethylene, obtaining polymer fraction (A-1) of the $C_2C_3$ random copolymer (A),
b) transferring said polymer fraction (A-1) and unreacted comonomers of the first reactor in a second reactor (R2),
c) feeding to said second reactor (R2) propylene and ethylene,
d) polymerizing in said second reactor (R2) and in the presence of said polymer fraction (A-1) propylene and ethylene obtaining polymer fraction (A-2)
said polymer fraction (A-1) and said polymer fraction (A-2) form the $C_2C_3$ random copolymer (A) as defined above,
whereby the polymerization takes place in the presence of a metallocene catalyst comprising (a) a complex of formula (I):

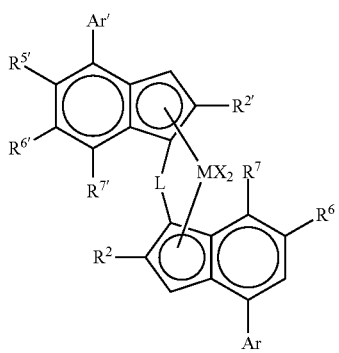

wherein M is zirconium or hafnium; each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16; wherein $R^{6'}$ is preferably a tertiary alkyl group
$R^7$ is hydrogen or $C_{1-20}$ hydrocarbyl group optionally containing one or more heteroatoms from groups 14-16 and $R^{7'}$ is hydrogen;
Ar and Ar' are each independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group; and
(ii) a cocatalyst comprising at least one or two compounds of a group 13 metal, e.g. Al and/or boron compound.

More preferably, a cocatalyst system comprising a boron containing cocatalyst, like a borate and an aluminoxane cocatalyst is used.

Even more preferably, the catalyst is supported on a silica support.

Ad Catalyst:

The catalyst used in the process of the invention is in solid particulate form. It can be supported on a conventional carrier, like silica, know to an art skilled person. Preferred complexes of use in the invention are of formula (II') or (II)

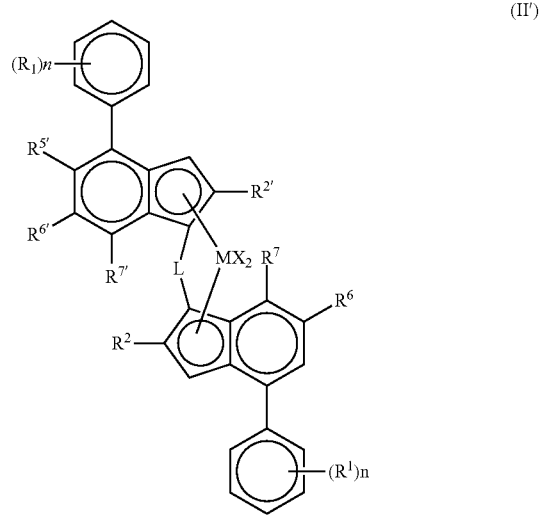

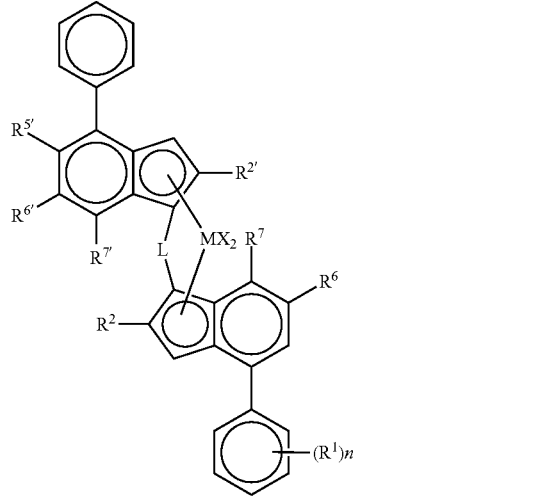

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group; preferably a tertiary alkyl group;

$R^7$ is hydrogen, a $C_{1-6}$ alkyl group or $ZR^3$ group;

$R^{7'}$ is hydrogen;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$ alkyl group.

Further preferred complexes of use in the invention are of formula (III') or (III):

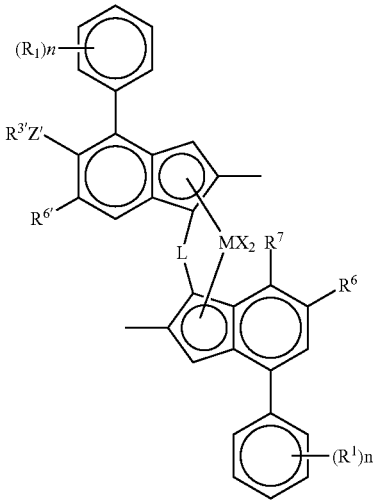

(III')

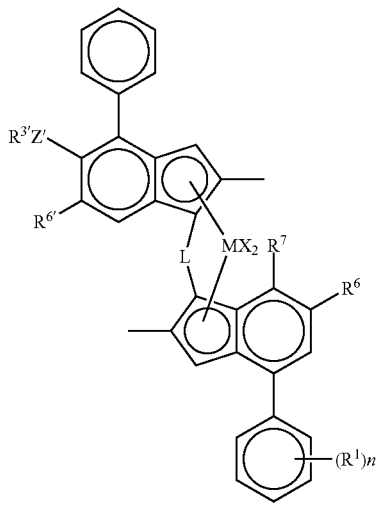

(III)

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

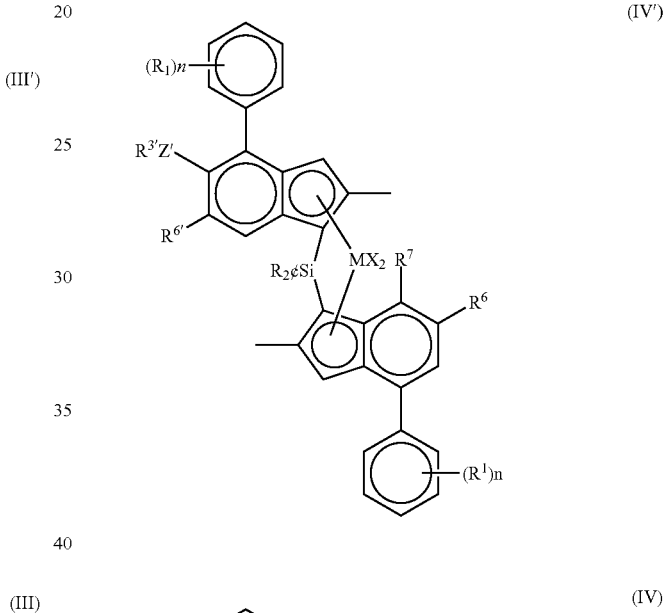

(IV')

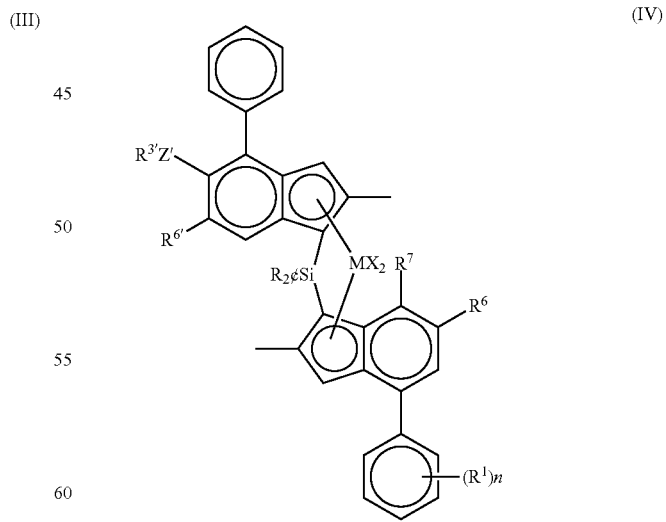

(IV)

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most preferably, the complex of use in the invention is of formula (V) or (V'):

wherein each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular compounds of the invention include:

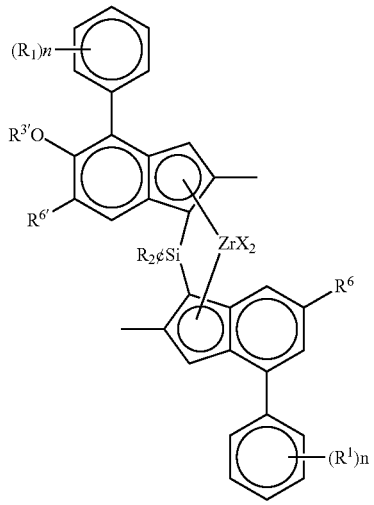

(V')

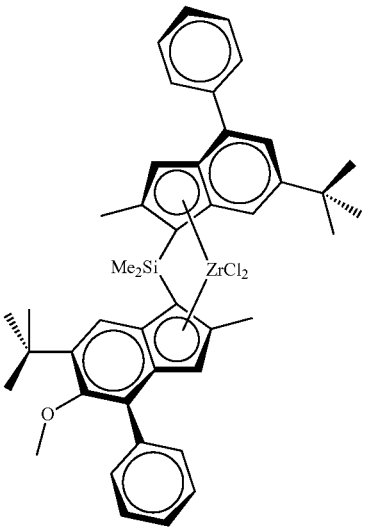

rac-anit-Me2Si(2-Me-4-Ph-6-tBu-Ind)(2-Me-4-Ph-5-OMe-6-tBu-Ind)ZrCl2

(V)

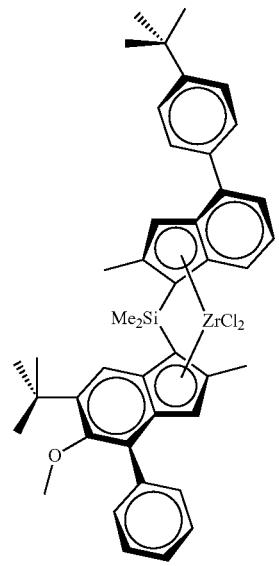

rac-anti-Me2Si(2-Me-4-(p-tBuPh)-Ind)(2-Me-4-Ph-5-OMe-6-tBu-Ind)ZrCl2

13
-continued
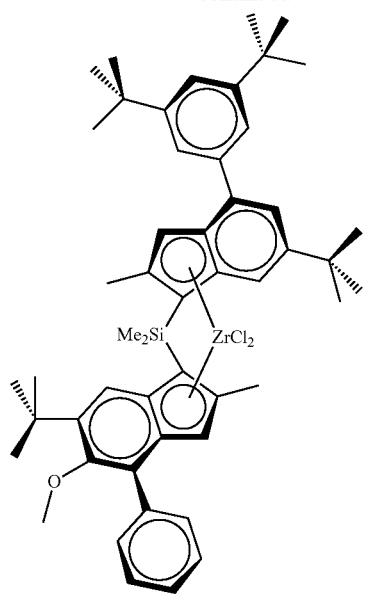
rac-anti-Me₂Si(2-Me-4-(3,5-di-tBuPh)-6-tBu-Ind)
(2-Me-4-Ph-5-OMe-6-tBu-Ind)ZrCl₂
14
-continued
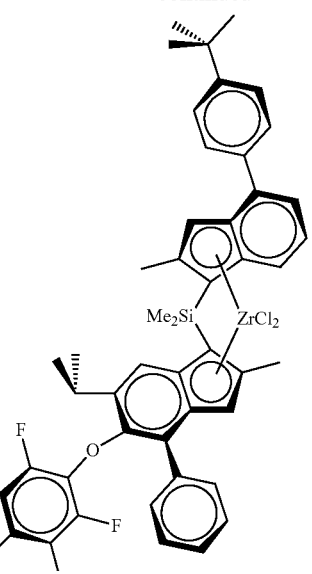
rac-anti-Me₂Si(2-Me-4-(p-tBuPh)-Ind)
(2-Me-4-Ph-5-OC₆F₅)-6-iPr-Ind)ZrCl₂
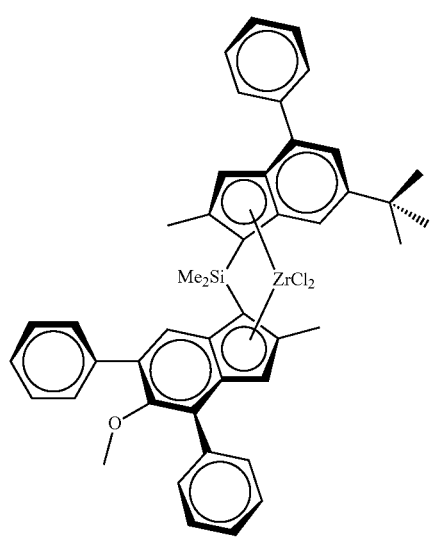
rac-anti-Me₂Si(2-Me-4-Ph-6-tBu-Ind)
(2-Me-4,6-di-Ph-5-OMe-Ind)ZrCl₂
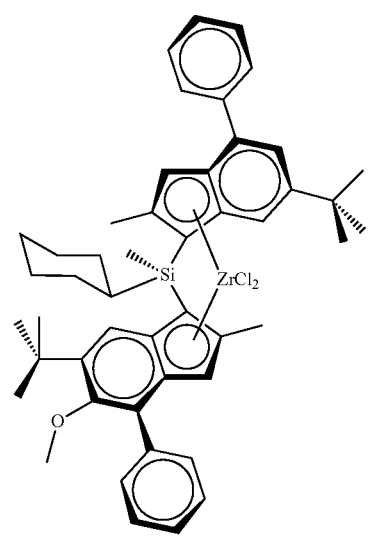
rac-anti-Me(CyHex)Si(2-Me-4-Ph-6-tBu-Ind)
(2-Me-4-Ph-5-OMe-6-tBu-Ind)ZrCl₂

-continued
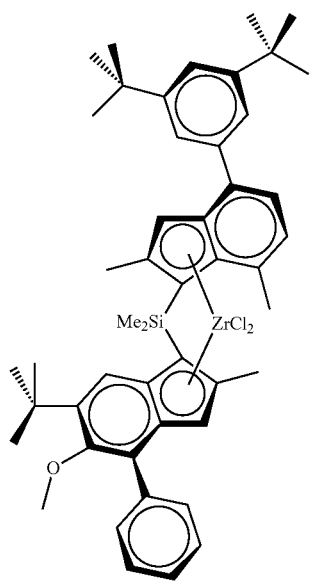
rac-anti-Me₂Si(2-Me-4-(3,5-di-tBuPh)-7-Me-Ind)
(2-Me-4-Ph-5-OMe-6-tBu-Ind)ZrCl₂
-continued
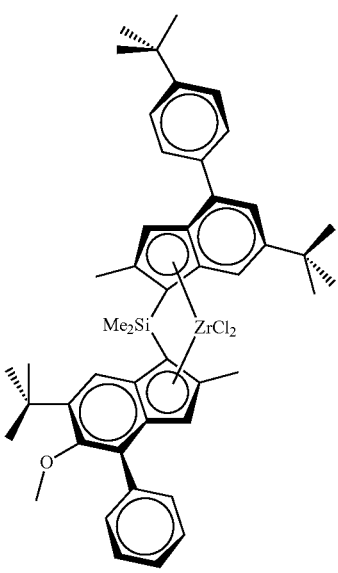
rac-anti-Me₂Si(2-Me-4-(p-tBuPh)-6-tBu-Ind)
(2-Me-4-Ph-5-OMe-6-tBu-Ind)ZrCl₂
rac-anti-Me₂Si(2-Me-4-(3,5-di-tBuPh)7-OMe-Ind)
(2-Me-4-Ph-5-OMe-6-tBu-Ind)ZrCl₂
rac-anti-Me₂Si(2-Me-4-(p-tBuPh)-Ind)
(2-Me-4-(4-tBuPh)-5-OMe-6-tBu-Ind)ZrCl₂

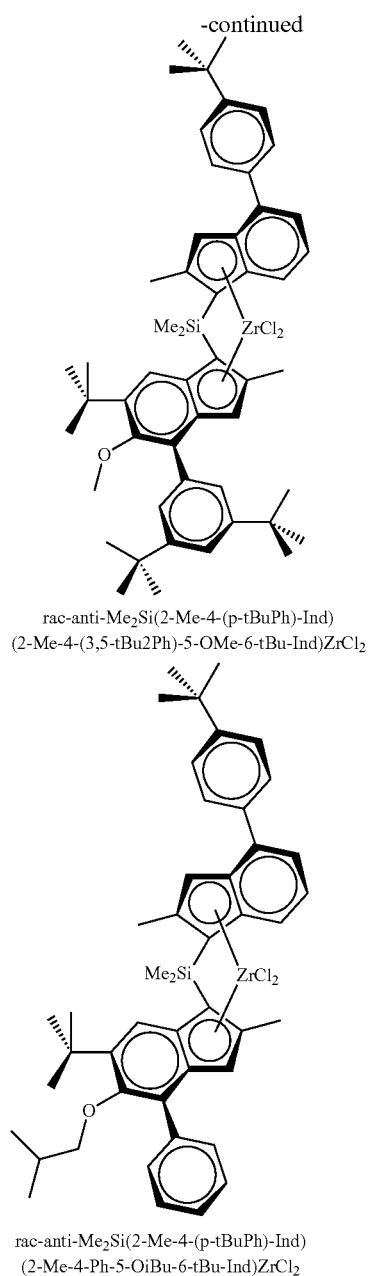

rac-anti-Me2Si(2-Me-4-(p-tBuPh)-Ind)
(2-Me-4-(3,5-tBu2Ph)-5-OMe-6-tBu-Ind)ZrCl2 rac-anti-Me2Si(2-Me-4-(p-tBuPh)-Ind)
(2-Me-4-Ph-5-OiBu-6-tBu-Ind)ZrCl2

Most preferably rac-anti-Me2Si(2-Me-4-(p-tBuPh)-Ind) (2-Me-4-Ph-5-OMe-6-tBu-Ind)ZrCl$_2$ is used.

The ligands required to form the complexes and hence catalysts of the invention can be synthesized by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (II):

(II)

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (II).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used.

Boron containing cocatalysts of interest include those of formula (III)

(III)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl) phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

However it is preferred that as a boron containing cocatalyst borates are used, i.e. compounds containing a borate.

These compounds generally contain an anion of formula:

(IV)

where Z is an optionally substituted phenyl derivative, said substituent being a halo-$C_{1-6}$-alkyl or halo group.

Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate or N,N-dimethylbenzylammoniumtetrakis(pentafluorophenyl)borate According to the present invention, it is especially preferred to use an aluminoxane cocatalyst, like MAO, together with a boron containing cocatalyst, like borate cocatalyst.

Suitable amounts of co-catalyst will be well known to the skilled person.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1 The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Catalyst System

The catalyst system used to manufacture the $C_2C_3$ random copolymers of the invention is ideally provided in solid particulate form supported on an external carrier.

The particulate support material used is silica or a mixed oxide such as silica-alumina.

The use of a silica support is preferred. The skilled man is aware of the procedures required to support a metallocene catalyst.

Especially preferably the support is a porous material so that the complex may be loaded into the pores of the particulate support, e.g. using a process analogous to those described in WO94/14856, WO95/12622 and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Propylene-1-Butene Plastomer

The $C_2C_3$ random copolymer composition comprises further component (B), which is a propylene-1-butene plastomer.

Component (B) can be present in an amount of from 5.0 to 30.0 wt %, based on the total weight of the composition, preferably in an amount of from 7.0 to 25.0 wt %, like in an amount of 8.0 to 22.0 wt %.

The propylene-1-butene has an $MFR_2$ (230° C./2.16 kg) measured according to ISO 1133 in the range of from 2.0 to 20.0 g/10 min, preferably in the range of from 3.0 to 15.0 g/10 min and more preferably in the range of from 4.0 to 12.0 g/10 min.

The melting point (measured with DSC according to ISO 11357) of suitable propylene-1-butene plastomers is in the range of from 60° C. to 110° C., preferably in the range of from 65° C. to 100° C. and more preferably in the range of from 70° C. to 95° C.

Suitable propylene-1-butene plastomers furthermore have a tensile modulus measured according to ASTM D638 in a range of from 50 to 450 MPa, preferably in a range of from 70 to 420 MPa and more preferably in a range of from 80 to 400 MPa.

The 1-butene content of such suitable propylene-1-butene plastomer is in the range of from 15.0 to less than 50.0 wt % based on the plastomer, preferably in the range of from 20.0 to 45.0 wt % and more preferably in the range of from 25.0 to 40.0 wt %.

The propylene-1-butene plastomer (B) may further comprise minor amounts of ethylene as further comonomer not exceeding 5.0 wt % based on the plastomer.

The density of the propylene-1-butene plastomer may typically be in the range of from 860 to 900 kg/m³, preferably in the range of from 865 to 895 kg/m³ and more preferably in the range of from 870 to 890 kg/m³.

Preferably, the propylene-1-butene plastomer is a metallocene catalyzed polymer although Ziegler-Natta based propylene-1-butene plastomer are also possible.

Suitable propylene-1-butene plastomer can be any copolymer of propylene and 1-butene having the above defined properties, which are commercially available e.g. under the trade Tafmer™ XM or Notio™ (Mitsui Company, Japan) or Softell™ (LyondellBasell Polyolefine GmbH, Germany).

Alternatively, the propylene-1-butene plastomer may be prepared by any suitable method known in the art. The skilled person will be familiar with such polymer preparation methods.

Additives

The inventive $C_2C_3$ random copolymer composition can optionally comprise as component (C) one or more additives in a total amount of from 0.1 up to 5.0 wt %, based on the composition (A+B+C, summing up to 100 wt %), selected from the group comprising slip agents, anti-block agents, UV stabilizers, antistatic agents, alpha-nucleating agents and antioxidants.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamide (CAS No. 112-84-5), oleamide (CAS No. 301-02-0), stearamide (CAS No. 124-26-5) or combinations thereof.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-$C_{4-4}$, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate (Kaolin) CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0)

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81)

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component. Preferably, at least an antioxidant is added.

Preparation of $C_2C_3$ Random Copolymer Composition

The process for producing the $C_2C_3$ random copolymer composition as described above comprises preferably the steps of
(i) preparing the $C_2C_3$ random copolymer (A) by polymerizing propylene and ethylene by a sequential polymerization process comprising at least two reactors connected in series in the presence of a metallocene catalyst,
(ii) mixing said $C_2C_3$ random copolymer (A) with an propylene-1-butene plastomer (B),
(iii) optionally adding one or more additives (C), to obtain a mixture of (A), (B) and optional (C) and
(iii) extruding said mixture to obtain the $C_2C_3$ random copolymer composition.

Step (i) is described above.

Article

The present invention is not only related to the composition itself, but also to its use and to articles comprising the inventive $C_2C_3$ random copolymer composition.

The $C_2C_3$ random copolymer composition of this invention can be converted to an end product, i.e. an article, by using normal conversion techniques, such as injection moulding, compression moulding, blow moulding (extrusion or injection stretch blow moulding), extrusion (film, sheet, pipe, tuber, profile extrusion), film blowing, thermoforming and the like. Preferably, articles are packaging containers made by injection moulding, blow moulding or thermoforming, or packaging films made by film extrusion.

The $C_2C_3$ random copolymer composition of the present invention is therefore suitable for the preparation of a variety of articles, like films (cast and blown film) for flexible packaging systems, such as bags or pouches for food and pharmaceutical packaging or medical articles in general as well as moulded articles.

Articles comprising the $C_2C_3$ random copolymer composition of the present invention have sufficient thermal stability to enable sterilization treatment.

Therefore, the present invention is also directed to a sterilizable or sterilized article, preferably to a sterilizable or sterilized film, like a sterilizable or sterilized cast or blown film, comprising the $C_2C_3$ random copolymer composition of the present invention.

Such films can be subjected to a steam sterilization treatment in a temperature range of about 120° C. to 130° C.

In an embodiment, the present invention is related to an article, the article being an unoriented mono-layer film comprising the inventive $C_2C_3$ random copolymer composition. Accordingly the present invention is also directed to an article, the article being an unoriented mono-layer film, like cast film or blown film, e.g. air cooled blown film, comprising at least 90 wt %, preferably comprising at least 95 wt %, yet more preferably comprising at least 99 wt %, of the instant $C_2C_3$ random copolymer composition.

The above described composition is suitable for the production of blown films as well as cast films. Preferred films are cast films.

Mono-layer films having a thickness of 5 to 300 µm, preferably 10 to 200 µm, more preferably 20 to 150 µm are suitable according to the present invention.

Films, preferably cast films, comprising the inventive $C_2C_3$ random copolymer composition have beneficial properties (i) to (iv):
(i) The films have a sealing initiation temperature (SIT) (determined on 50 µm cast film as described in the experimental part) in the range of from 80° C. to below 110° C.

Preferably, the films have a sealing initiation temperature (SIT) in the range of from 80° C. to 105° C., more preferably in the range of from 85° C. to less than 100° C., like in the range of from 88° C. to less than 98° C.

The low SIT of such a film is combined with (ii) a high hot tack force determined on 50 µm cast film (as described in the experimental part) of above 2.5 up to 6.0 N.

Preferably, the films have a high hot tack force in the range of from 2.8 up to 5.5 N, more preferably in the range of from 3.0 to 5.0 N.

The films have (iii) a haze (determined according to ASTM D 1003-00 on 50 μm cast film) of below 3.0%, preferably of below 2.0%, and more preferably of below 1.5%.

A suitable lower limit is for example 0.05%. Thus, suitable ranges are 0.05% to below 3.0%, preferably 0.10% to below 2.0% and more preferably 0.15% to below 1.5%.

The films furthermore have a haze value (determined according to ASTM D 1003-00 on 50 μm cast film) after steam sterilization at 121° C. for 30 min of below 7.0%, preferably of below 5.0%, and more preferably of below 4.0%.

A suitable lower limit is for example 1.5%. Thus, suitable ranges are 1.5% to below 7.0%, preferably 2.0% to below 5.0% and more preferably 2.5% to below 4.0%.

In addition, the films have (iv) a clarity (determined according to ASTM D1003-00 on cast films with a thickness of 50 μm) of at least 85.0% up to 100.0%, preferably of at least 90.0% and more preferably of at least 95.0%.

The clarity (determined according to ASTM D 1003-00 on cast films with a thickness of 50 μm) after sterilization (steam sterilization at 121° C. for 30 min) is at least 75.0% up to 98.0, preferably of at least 80.0% and more preferably of at least 85.0%.

Thus, according to a further embodiment the present invention is also related to sterilizable or sterilized articles comprising the $C_2C_3$ random copolymer composition of the present invention, whereby the articles are films and the films are characterized by (i) a sealing initiation temperature (SIT) (determined on 50 μm cast film as described in the experimental part) in the range of from 80° C. to below 110° C., (ii) a hot tack force determined on 50 μm cast film (as described in the experimental part) of above 2.5 up to 6.0 N, (iii) a haze (determined according to ASTM D 1003-00 on 50 μm cast film) in the range of from 0.05 to below 3.0%, and a haze value (determined according to ASTM D 1003-00 on 50 μm cast film) after steam sterilization at 121° C. for 30 min in the range of from 1.5 to below 7.0%, (iv) a clarity (determined according to ASTM D1003-00 on cast films with a thickness of 50 μm) of at least 85.0% up to 100.0% and a clarity (determined according to ASTM D1003-00 on cast films with a thickness of 50 μm) after sterilization (steam sterilization at 121° C. for 30 min) of at least 75.0% up to 98.0.

Furthermore such films shall preferably have a tensile modulus (v) determined according to ISO 527-3 at 23° C. on cast films with a thickness of 50 μm in machine direction as well as in transverse direction in the range of 200 to 500 MPa, more preferably in the range of 250 to 450 MPa, like in the range of 280 to 400 MPa.

The relative total penetration energy (Wbreak) as determined by the "Dynatest" method according to ISO 7725-2 at +23° C. on a cast film with a thickness of 50 μm is in the range of from 20.0 to 65.0 J/mm, preferably in the range of from 26.0 to 60.0 J/mm, or even more preferably in the range of from 28.0 to 55.0 J/mm.

In a further preferred embodiment the film preferably has a relative total penetration energy (Wbreak) as determined by the "Dynatest" method according to ISO 7725-2 at 0° C. on a cast film with a thickness of 50 μm in the range of 6.0 to 20.0 J/mm, preferably in the range of from 7.0 to 18.0 J/mm, or even more preferably in the range of from 8.0 to 15.0 J/mm.

In another embodiment of the present invention, the films have a resistance factor (R-factor) according to formula $$R\text{-factor} = \frac{\text{Tensile Modulus } (MD)[\text{MPa}] * HTF\,[N]}{\text{Haze}\,(b.s)[\%]}$$

of at least 3 800 up to 10 000.

Preferably, the resistance factor (R-factor) is above 4 000 up to 8 000, more preferably above 4 200 up to 7 000.

The resistance factor (R-factor) for films according to the present invention is determined by multiplying Tensile Modulus (MD) and hot tack force (HTF) and putting this product in relation to haze determined before sterilization.

Preferably, the above described films comprise the inventive $C_2C_3$ random copolymer composition.

A multi-layer film construction comprising at least one layer comprising the inventive $C_2C_3$ random copolymer composition is preferably produced by multi-layer co-extrusion followed by film casting or film blowing. In this case, at least one of the outermost layers of said multi-layer film construction serving as sealing layer(s) shall comprise the inventive $C_2C_3$ random copolymer composition as defined above. The inventive multilayer film construction shall preferably have a thickness in the range of 30 to 500 μm, more preferably in the range of 50 to 400 μm, like in the range of 60 to 300 μm. The sealing layer(s) comprising the inventive $C_2C_3$ random copolymer shall preferably have a thickness in the range of 3 to 50 μm, more preferably in the range of 5 to 30 μm, like in the range of 8 to 25 μm.

Films and/or multi-layer film constructions according to the present invention shall preferably be used for flexible packaging systems, such as bags or pouches for food and pharmaceutical packaging or medical articles in general.

The following definitions of terms and determination methods apply for the above general description of the invention as well as to the below examples unless otherwise defined.

Measuring Methods

Calculation of Comonomer Content of the Second Polymer Fraction (A-2):

$$\frac{C(A) - w(A) \times C(A1)}{w(A2)} = C(A2) \qquad (I)$$

wherein w(A-1) is the weight fraction [in wt %] of the first polymer fraction (A-1), w(A-2) is the weight fraction [in wt %] of second polymer fraction (A-2), C(A-1) is the comonomer content [in wt %] of the first polymer fraction (A-1), C(A) is the comonomer content [in wt %] of the $C_2C_3$ random copolymer (A), C(A-2) is the calculated comonomer content [in wt %] of the second polymer fraction (A-2).

Calculation of Melt Flow Rate $MFR_2$ (230° C.) of the Polymer Fraction (A-2):

$$MFR(A2) = 10^{\left[\frac{\log(MFR(A)) - w(A1) \times \log(MFR(A1))}{w(A2)}\right]} \qquad (II)$$

wherein
- w(A1) is the weight fraction [in wt %] of the polymer fraction A-1,
- w(A2) is the weight fraction [in wt %] of the polymer fraction A-2,
- MFR(A1) is the melt flow rate MFR$_2$ (230° C.) [g/10 min] of the polymer fraction A-1,
- MFR(A) is the melt flow rate MFR$_2$ (230° C.) [g/10 min] of the C$_2$C$_3$ random copolymer (A),
- MFR(A2) is the calculated melt flow rate MFR$_2$ (230° C.) [g/10 min] of the polymer fraction A-2.
- MFR$_2$ (230° C.) is measured according to ISO 1133 (230° C., 2.16 kg load).

Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The Xylene Solubles (XCS, Wt %):

Content of xylene cold solubles (XCS) is determined at 25° C. according ISO 16152; 2005

DSC analysis, melting temperature (T$_m$) and crystallization temperature (T$_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (T$_c$) and crystallization enthalpy (H$_c$) are determined from the cooling step, while melting temperature (T$_m$) and melting enthalpy (H$_m$) are determined from the second heating step.

Flexural modulus is determined according to ISO 178 on 80×10×4 mm$^3$ test bars injection moulded in line with EN ISO 1873-2.

Tensile modulus in machine and transverse direction were determined according to ISO 527-3 at 23° C. on cast films of 50 µm thickness produced on a monolayer cast film line with a melt temperature of 220° C. and a chill roll temperature of 20° C. with a thickness of 50 µm produced as indicated below. Testing was performed at a cross head speed of 1 mm/min.

Transparency, haze and clarity were determined according to ASTM D1003-00 on cast films with a thickness of 50 µm produced as indicated below.

Sealing initiation temperature (SIT); (sealing end temperature (SET), sealing range): The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 µm thickness with the following further parameters:

| | |
|---|---|
| Specimen width: | 25.4 mm |
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Hot Tack Force:

The hot-tack force was determined according to ASTM F1921-12—Method B on a J&B Hot-Tack Tester on a 50 µm thickness film produced on a monolayer cast film line.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions:

Film Specimen width: 25.4 mm.

Seal bar length: 50 mm; Seal bar width: 5 mm; Seal bar shape: flat

Seal Pressure: 0.3 N/mm$^2$; Seal Time: 0.5 sec; Cool time: 99 sec, Peel Speed: 200 mm/sec.

Start temperature: 90° C. End temperature: 140° C. Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve. The hot tack force (HTF) is evaluated from the curve as the highest force (maximum peak value) with failure mode "peel".

Relative Total Penetration Energy:

The impact strength of films is determined by the "Dynatest" method according to ISO 7725-2 at +23° C. and at 0° C. on cast films with a thickness of 50 µm produced on a monolayer cast film line with a melt temperature of 220° C. and a chill roll temperature of 20° C. The value "Wbreak" [J/mm] represents the relative total penetration energy per mm thickness that a film can absorb before it breaks divided by the film thickness. The higher this value, the tougher the material is.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

Al and Zr Determination (ICP-Method)

In a glovebox, an aliquot of the catalyst (ca. 40 mg) was weighted into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 µm Nylon syringe filters and then subjected to analysis using Thermo iCAP 6300 ICP-OES and iTEVA software.

The instrument was calibrated for Al, B, Hf, Mg, Ti and Zr using a blank (a solution of 5% HNO3) and six standards of 0.005 mg/L, 0.01 mg/L, 0.1 mg/L, 1 mg/L, 10 mg/L and 100 mg/L of Al, B, Hf, Mg, Ti and Zr in solutions of 5% HNO3 distilled water. However, not every calibration point was used for each wavelength. Each calibration solution contained 4 mg/L of Y and Rh standards. Al 394.401 nm was calibrated using the following calibration points: blank, 0.1 mg/L, 1 mg/L, 10 mg/L and 100 mg/L. Al 167.079 nm was calibrated as Al 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Al, B, Hf, Mg, Ti and Zr. The QC sample was also run at the end of a scheduled analysis set.

The content for Zr was monitored using Zr 339.198 nm {99} line. The content of aluminium was monitored via the 167.079 nm {502} line, when Al concentration in test portion was under 2 wt % and via the 394.401 nm {85} line for Al concentrations above 2 wt %. Y 371.030 nm {91} was used as internal standard for Zr 339.198 nm and Al 394.401 nm and Y 224.306 nm {450} for Al 167.079 nm.

The reported values were back calculated to the original catalyst sample using the original mass of the catalyst aliquot and the dilution volume.

EXAMPLES

The catalyst used in the polymerization processes for the $C_2C_3$ random copolymer (A) of the inventive example (IE1) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

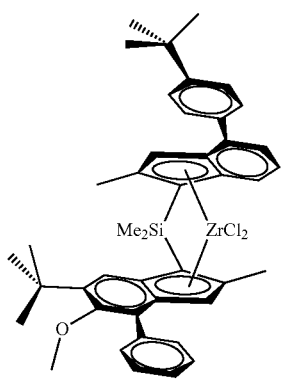

has been synthesized according to the procedure as described in WO WO2013007650, E2.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32 kg) was added. The mixture was stirred for 15 min. Next 30 wt % solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.6% Al by weight.

Catalyst System Preparation for Inventive Example IE1

30 wt % MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under $N_2$ flow at 60° C. for 2 h and additionally for 5 h under vacuum (−0.5 barg) under stirring. Dried catalyst was sampled in the form of pink free flowing powder containing 13.9 wt % Al and 0.26 wt % Zr The polymerization for preparing the $C_2C_3$ random copolymer (A) for the inventive composition was performed in a Borstar pilot plant with a 2-reactor set-up (loop—GPR 1).

TABLE 1

| polymerization conditions for copolymer (A) | A |
|---|---|
| Prepoly reactor | |
| Temperature [° C.] | 25 |
| Pressure [Pa] | 5469 |
| Residence time [h] | 0.4 |
| loop reactor | |
| Temperature [° C.] | 68 |
| Pressure [Pa] | 5388 |
| Feed H2/C3 ratio [mol/kmol] | 0.69 |
| Feed C2/C3 ratio [mol/kmol] | 48.4 |
| Polymer Split [wt %] | 52 |
| MFR2 [g/10 min] (MFR of A-1) | 9.9 |
| Total C2 loop [wt %] (C2 of A-1) | 3.9 |
| Residence time [h] | 0.5 |
| GPR1 | |
| Temperature [° C.] | 75 |
| Pressure [Pa] | 2400 |
| H2/C3 ratio [mol/kmol] | 8 |
| C2/C3 ratio [mol/kmol] | 242 |
| Polymer residence time (h) | 2.0 |
| Polymer Split [wt %] | 48 |
| Total MFR2 [g/10 min] | 8.3 |
| MFR2 [g/10 min] in GPR1 (MFR of A-2) | 6.9 |
| Total C2 [wt %] (loop + GPR1) | 4.4 |
| C2 in GPR1 [wt %] (C2 of A-2) | 4.9 |
| XCS [wt %] | 12.3 |
| Total productivity (kg PP/g cat) | 35 |

The polymer powder was compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9)

TABLE 2

| Pellet | A |
|---|---|
| XCS [wt %] | 12.3 |
| Total C2 [wt %] | 4.4 |
| MFR2 [g/10 min] | 8.1 |
| Tm [° C.] | 122 |
| Tc [° C.] | 83 |

For Inventive Example 1 (IE1), the $C_2C_3$ random copolymer (A) produced as described above was mixed with an propylene-1-butene plastomer (B).

The following commercially available plastomer (B) has been used: 10.0 wt % of Tafmer XM 7080, a C3C4 plastomer, with Tm 83° C., MFR (230° C., 2.16) 7 g/10 min, density 876 kg/m³, 1-butene content 26.2 wt %, tensile modulus 390 MPa, commercially available from Mitsui.

For Comparative Example 1 (CE1) TD315CF, a $C_2C_3C_4$ terpolymer with Tm 131° C., MFR 6.0 g/10 min, commercially available from *Borealis* AG was used instead of $C_2C_3$ random copolymer (A). The polymer has a 1-butene content of 8.9 wt % and an ethylene content of 1.0 wt %, the amount of xylene cold soluble (XCS) fraction is 11.9 wt %.

In Comparative Example 2 (CE2) no plastomer (B) was added.

Mixing was done in a co-rotating twin-screw extruder Coperion ZSK 57.

The inventive and comparative propylene compositions were converted to monolayer cast films with a thickness of 50 μm on a PM30 cast line (type laboratory extruder provided by Plastik Maschinenbau GmbH., Germany). The equipment consists of an extruder, chill roll with air knife and a winder.

A PP 3-zone screw with a diameter of 30 mm, 25D length, 200 mm die, die gap 0.5 mm is applied in combination with a coat-hanger slit die assembly.

The extrusion parameters were as follows:

Extruder temperature profile: 220° C./240° C./250° C./260° C./260° C. (Melt temperature 250° C.; melt pressure 61 bar); Extruder speed: 50 rpm; Chill roll temperature: 20° C. take-off speed: 10.2 m/min In Table 3 the optical parameters (before sterilization, b.s.) as well as the sealing performance, tensile modulus and hot tack force can be seen.

TABLE 3

Sealing performance, tensile and optics before sterilization (b.s.)

|  |  | IE1 | CE1 | CE2 |
| --- | --- | --- | --- | --- |
| $C_2C_3$ random copolymer (A) | [wt %] | 90 | — | 100 |
| TD315CF | [wt %] | — | 90 | — |
| XM7080 | [wt %] | 10 | 10 | — |
| Tensile modulus (MD) | [MPa] | 329 | 356 | 409 |
| Tensile modulus (TD) | [MPa] | 299 | 360 | 411 |
| Wbreak +23° C. | [J/mm] | 30.0 | 57.3 | 25.7 |
| Wbreak 0° C. | [J/mm] | 9.3 | 6.1 | 6.5 |
| SIT | [° C.] | 91 | 103 | 100 |
| Hot-tack force | [N] | 3.58 | 1.76 | 2.19 |
| Haze b.s. | [%] | 0.23 | 1.22 | 0.25 |
| Clarity b.s. | [%] | 99.9 | 97.9 | 100 |
| R-factor | [(MPa*N)/(%)] | 5354 | 514 | 3583 |

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

The optical parameters after sterilization (a.s.) can be seen in Table 4.

TABLE 4

Optics after sterilization (a.s.)

|  |  | IE1 | CE1 | CE2 |
| --- | --- | --- | --- | --- |
| Haze (a.s.) | [%] | 3.8 | 7.39 | 2.43 |
| Clarity (a.s.) | [%] | 93 | 70 | 95 |

From the above tables it can be clearly seen that the inventive polypropylene compositions are characterised by an advantageous combination of low sealing initiation temperature (SIT), high hot-tack and good optical properties, like low haze and high clarity, and an improved resistance factor (R-factor).

The invention claimed is:

1. A $C_2C_3$ random copolymer composition comprising:
A) 70.0 to 95.0 wt % of a $C_2C_3$ random copolymer having:
   a) an ethylene content in a range of from 2.5 to 5.5 wt %;
   b) a melt flow rate $MFR_2$ (230° C./2.16 kg) measured according to ISO 1133 in a range of from 4.0 to 12.0 g/10 min;
   c) a melting temperature Tm as determined by DSC according to ISO 11357 of from 115° C. to 135° C. and
   d) a xylene cold soluble (XCS) fraction of greater than or equal to from 0.1 wt % and less than 15.0 wt %, and
B) 5.0 to 30.0 wt % of a propylene-1-butene plastomer, which has a 1-butene content in a range of greater than or equal to from 15.0 wt % and less than 50.0 wt % based on the plastomer, having
   e) a $MFR_2$ (230° C./2.16 kg) measured according to ISO 1133 in a range of 2.0 to 20.0 g/10 min,
   f) a melting temperature Tm as determined by DSC according to ISO 11357 of from 60° C. to 110° C. and
   g) a tensile modulus measured according to ASTM D638 in a range of from 50 to 450 MPa.

2. The $C_2C_3$ random copolymer composition according to claim 1, wherein the $C_2C_3$ random copolymer (A) comprises:
30.0 to 70.0 wt % of polymer fraction (A-1) having:
   i) an ethylene content in a range of from 1.5 to 4.5 wt % and
   ii) a melt flow rate $MFR_2$ (230° C./2.16 kg) measured according to ISO 1133 in a range of from 4.0 to 15.0 g/10 min and
70.0 to 30.0 wt % of polymer fraction (A-2) having
   i) an ethylene content in a range of from 4.6 to 7.5 wt % and
   ii) a melt flow rate $MFR_2$ (230° C./2.16 kg) measured according to ISO 1133 in a range of from 4.0 to 15.0 g/10 min.

3. The $C_2C_3$ random copolymer composition according to claim 1, wherein the propylene-1-butene plastomer (B) has:
an $MFR_2$ (230° C./2.16 kg) measured according to ISO 1133 in a range of 3.0 to 15.0 g/10 min,
a melting temperature Tm as determined by DSC according to ISO 11357 of from 65° C. to 100° C. and
a tensile modulus measured according to ASTM D638 in a range of from 70 to 420 MPa.

4. The $C_2C_3$ random copolymer composition according to claim 1, wherein the propylene-1-butene plastomer (B) has a 1-butene content in a range of from 20.0 to 45.0 wt % based on the plastomer, and
a density in a range of from 860 to 900 kg/m$^3$.

5. The process for producing a $C_2C_3$ random copolymer composition according to claim 1, the process comprising the steps of:
   i) preparing the $C_2C_3$ random copolymer (A) by polymerizing propylene and ethylene by a sequential polymerization process comprising at least two reactors connected in series in the presence of a metallocene catalyst,
   ii) mixing said $C_2C_3$ random copolymer (A) with a propylene-1-butene plastomer (B),
   iii) optionally adding one or more additives (C), to obtain a mixture of (A), (B) and optional (C), and
   iv) extruding said mixture to obtain the $C_2C_3$ random copolymer composition.

6. A process for producing a $C_2C_3$ random copolymer composition according to claim 5, wherein step (i) comprises the following steps:
   a) polymerizing in a first reactor (R1) propylene and ethylene, obtaining polymer fraction (A-1) of the $C_2C_3$ random copolymer (A), b) transferring said polymer fraction (A-1) and unreacted comonomers of the first reactor in a second reactor (R2),
c) feeding to said second reactor (R2) propylene and ethylene,
d) polymerizing in said second reactor (R2) and in the presence of said polymer fraction (A-1) propylene and ethylene obtaining polymer fraction (A-2),
said polymer fraction (A-1) and said polymer fraction (A-2) form the $C_2C_3$ random copolymer (A), and
wherein the polymerization takes place in the presence of a metallocene catalyst comprising (i) a complex of formula (I):

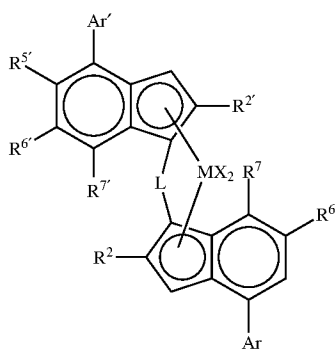

wherein M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, or —R'$_2$Ge-, wherein each R' is independently a hydrogen atom, $C_1$-$C_{20}$-hydrocarbyl, tri ($C_1$-$C_{20}$-alkyl) silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ is hydrogen or $C_{1-20}$ hydrocarbyl group optionally containing one or more heteroatoms from groups 14-16 and R7' is hydrogen;
Ar and Ar' are each independently an aryl or heteroaryl group having up to 20 carbon atoms optionally substituted by one or more groups R1;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group; and
(ii) a cocatalyst comprising at least one or two compounds of a group 13 metal.

7. The process according to claim 6, wherein as cocatalyst (ii) a cocatalyst system comprising a boron containing cocatalyst and an aluminoxane cocatalyst is used and the catalyst is supported on a silica support.

8. A sterilizable or sterilized article, comprising a $C_2C_3$ random copolymer composition according to claim 1.

9. The sterilizable or sterilized article according to claim 8, wherein the article is a film and the film has:
(i) a seal initiation temperature (SIT, determined on a 50 μm cast film) in a range of greater than or equal to 80° C. and less than 110° C.,
(ii) a hot-tack force (determined on a 50 μm cast film) in a range of from 2.5 to 6.0 N,
(iii) a haze (determined according to ASTM D1003-00 on cast film with a thickness of 50 μm) of greater than or equal to 0.05% and less than 3.0%, and a haze (determined according to ASTM D 1003-00 measured on a 50 μm cast film) after sterilization (steam sterilization at 121° C. for 30 min) of greater than or equal to 1.5% and less than 7.0%, and
(iv) a clarity (determined according to ASTM D1003-00 on cast films with a thickness of 50 μm) of from 85.0% up to 100.0% and a clarity (determined according to ASTM D1003-00 on cast films with a thickness of 50 μm) after sterilization (steam sterilization at 121° C. for 30 min) of from 75.0% up to 98.0%.

10. The sterilizable or sterilized article according to claim 9, wherein the films has:
a tensile modulus determined according to ISO 527-3 at 23° C. on cast films with a thickness of 50 μm in machine direction as well as in transverse direction in a range of 200 to 500 MPa, and/or
a relative total penetration energy (Wbreak) as determined by the "Dynatest" method according to ISO 7725-2 at 0° C. on a cast film with a thickness of 50 μm in a range of 6.0 to 20.0 J/mm, and
a relative total penetration energy (Wbreak) as determined by the "Dynatest" method according to ISO 7725-2 at +23° C. on a cast film with a thickness of 50 μm is in a range of from 20.0 to 65.0 J/mm.

11. The sterilizable or sterilized article according to claim 9, wherein the films has:
a resistance factor (R-factor) according to formula:

$$R-\text{factor} = \frac{\text{Tensile Modulus }(MD)\text{ [MPa]} * HTF[N]}{\text{Haze }(b.s.)[\%]}$$

of greater than 3 800 and less than or equal to 10 000, wherein:
Tensile Modulus (MD) is determined according to ISO 527-3 at 23° C. on cast films with a thickness of 50 μm in machine direction,
HTF is the hot-tack force measured on 50 μm cast film, and
Haze (b.s.) is determined according to ASTM D1003-00 on cast film with a thickness of 50 μm before sterilization.

12. A multi-layer film comprising the sterilizable or sterilized article film according to claim 9, wherein the sterilizable or sterilized article is a film that forms a sealing layer in the multi-layer film.

13. A flexible packaging system, selected from a bag or a pouch for food and pharmaceutical packaging, comprising the sterilizable or sterilized article according to claim 9.

* * * * *